United States Patent [19]

Mori

[11] Patent Number: 4,682,844

[45] Date of Patent: Jul. 28, 1987

[54] DEVICE FOR DIVERTING THE DIRECTION OF LIGHT TRAVELLING THROUGH AN OPTICAL CONDUCTOR

[76] Inventor: Kei Mori, 3-16-3-501, Kaminoge, Setagaya-ku, Tokyo, Japan

[21] Appl. No.: 651,548

[22] Filed: Sep. 17, 1984

[30] Foreign Application Priority Data

Sep. 26, 1983 [JP] Japan ................................ 58-178928

[51] Int. Cl.$^4$ ................................................ G02B 6/26
[52] U.S. Cl. .............................. 350/96.15; 350/96.10; 350/170; 350/173; 350/267; 350/486
[58] Field of Search ............... 350/96.15, 96.16, 96.18, 350/170, 171, 172, 173, 267, 484, 486, 96.10; 362/32

[56] References Cited

U.S. PATENT DOCUMENTS

| 4,173,390 | 11/1979 | Käch ................................. | 350/96.16 |
| 4,344,110 | 8/1982 | Ruediger ............................ | 362/32 |
| 4,378,143 | 3/1983 | Winzer .............................. | 350/96.16 |
| 4,400,054 | 8/1983 | Biard et al. ....................... | 350/96.15 |
| 4,576,436 | 3/1986 | Daniel .............................. | 350/96.15 X |

FOREIGN PATENT DOCUMENTS 0103318  6/1985  Japan ................................ 350/96.15

OTHER PUBLICATIONS

Taylor, G. W., *Applied Optics*, "Electrical Control of Light by Fluid Logic Devices," vol. 12, No. 6, pp. 1227–1239, (June 1973).

*Primary Examiner*—John Lee
*Attorney, Agent, or Firm*—Jordan and Hamburg

[57] ABSTRACT

A light diverting and switching device connected in cascade between a transparent cylindrical optical conductor at a light source side and another transparent cylindrical optical conductor at a light emission side for diverting and picking up a part of light transmitted through the optical conductor. The light diverting and switching device is constructed with a first transparent cylindrical member having one surface formed on a horizontal plane connected with the optical conductor at the light source side and another surface formed on an inclined plane, a second transparent cylindrical member having one surface formed on an inclined plane connected with the inclined surface of the first cylindrical member and another surface formed on a horizontal plane connected with the optical conductor at the light emission side and further provided with a circular hole elongated in a horizontal direction toward the inclined surface, a third transparent cylindrical member for adjusting the diverted light installed so as to move back and forth in the circular hole of the second cylindrical member and having an edge surface formed on an inclined plane the same as the inclined surface of the second cylindrical member, and a fourth transparent cylindrical member for receiving the diverted light connected with the first cylindrical member and having a connected surface opposed to the third cylindrical member.

8 Claims, 7 Drawing Figures

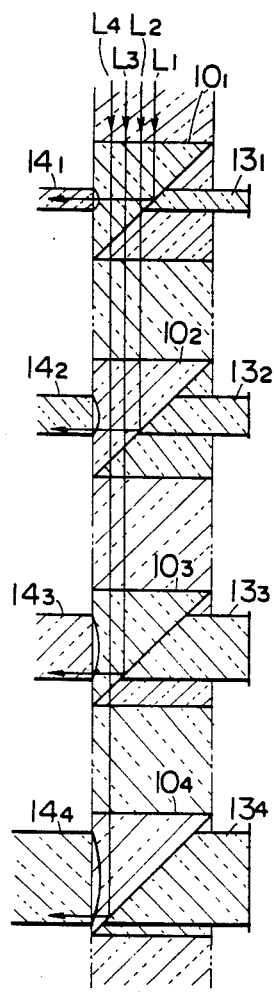

4,682,844

DEVICE FOR DIVERTING THE DIRECTION OF LIGHT TRAVELLING THROUGH AN OPTICAL CONDUCTOR

BACKGROUND OF THE INVENTION

The present invention relates to a light diverting and switching device for diverting a part of the light energy transmitted through an optical conductor and for picking it up outside the optical conductor.

The present applicant has already proposed in various ways that solar rays or artificial rays are focused by a lens or the like and guided into an optical conductor and then transmitted through the optical conductor onto an optional desired place for use in illumination or for other purposes.

On that occasion, however, if the light energy transmitted through the optical conductor, as mentioned above, can be diverted and picked up from the optical conductor on the outside thereof, the utilization efficiency of the light energy may be much improved. Conventionally there didn't exist such a light diverting and switching means so that it was less feasible to use a solar ray collecting device.

SUMMARY OF THE INVENTION

It is therefore an object of the present invention to provide a light diverting and switching device capable of effectively diverting and picking up outside of the optical conductor a part of the light energy transmitted through it.

It is another object of the present invention to provide a light diverting and switching device connected in cascade between a transparent cylindrical optical conductor at its light source side and another transparent cylindrical optical conductor at its light emission side for diverting and picking up a part of the light transmitted through it.

It is another object of the present invention to provide a light diverting and switching device comprised of a first transparent cylindrical member having one surface formed on a horizontal plane so as to be connected with an optical conductor at the light source side and another surface formed on an inclined plane, a second transparent clindrical member having one surface formed on an inclined plane to be connected with the inclined surface of the first cylindrical member and another surface formed on a horizontal plane to be connected with an optical conductor at the light emission side and further provided with a circular hole elongated in a horizontal direction toward the inclined surface, a third transparent cylindrical member for adjusting the diverted light which is installed so as to move back and forth in the circular hole of the second cylindrical member and has an edge surface formed on an inclined plane the same way as the inclined surface of the second cylindrical member, and a fourth transparent cylindrical member for use in the diverted light which is connected with the first cylindrical member and has a connecting surface opposed to the third cylindrical member.

BRIEF DESCRIPTION OF THE DRAWINGS

FIG. 7 is a cross-sectional view showing the functions of a light diverting and switching device when being used to illuminate different floor-levels of a building.

DETAILED DESCRIPTION OF THE PREFERRED EMBODIMENTS

Figure 1:
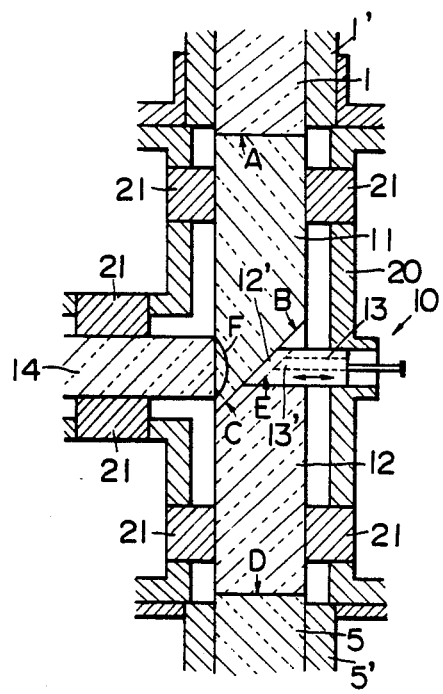
FIG. 1 is a cross-sectional view showing an embodiment of a light diverting and switching device according to the present invention.

FIG. 1 is a cross-sectional view showing an embodiment of a light diverting and switching device according to the present invention. In FIG. 1, 1 is a cylindrical optical conductor at the light source side, 5 is another cylindrical optical conductor at the light emission side, and 10 is a light diverting and switching device.

The light diverting and switching device 10 is comprised of a first transparent cylindrical member 11 having one surface A formed on a horizontal plane so as to be connected with the optical conductor 1 at the light source side and another surface B formed on an inclined plane, a second transparent cylindrical member 12 having one surface C formed on an inclined plane to be connected with the inclined surface B of the first cylindrical member 11 and another surface D formed on a horizontal plane to be connected with the optical conductor 5 at the light emission side and further provided with a circular hole 12' elongated in a horizontal direction toward the inclined surface C (in a perpendicular direction toward the cylindrical member), a third transparent cylindrical member 13 for diverting and switching the light (adjusting the diverted light) which is installed so as to move back and forth in the (circular) hole 12' of the second cylindrical member 12 and has an edge surface E formed on an inclined plane the same as the inclined surfaces B and C, and a fourth transparent cylindrical member 14 for using the diverted light which is connected with the first cylindrical member 11 and has a connecting surface opposed to the third cylindrical member 13. The inclined surfaces of the first cylindrical member 11 and the second cylindrical member 12 are connected with each other by use of an optical paste, an optical gel, or an optical matching oil.

Therefore, when the third cylindrical member 13 for use in light emission switching is inserted into the hole 12' of the second cylindrical member 12 and, as a result the inclined edge surface E of the third cylindrical member 13 coincides with the inclined surface B of the first cylindrical member 11, all of the light energies transmitted through the first cylindrical member 11 are transmitted to the second cylindrical member 12. However, when the third cylindrical member 13 is retrenched and moves backward so that the inclined surface E thereof parts from the inclined surface B of the first cylindrical member 11, a gap formed by the aforementioned hole 12' exists between the inclined surface B of the first cylindrical member 11 and the inclined edge surface E of the third cylindrical member 11. Consequently, a part of the light energies transmitted through the first cylindrical member 11 is reflected on the inclined surface B on the opposite side of the gap and is guided into the fourth cylindrical member 14 and further transmitted onto an optional desired place.

Furthermore, an air hole 13' connected to the inclined surface E is bored in the third cylindrical member 13. The hole 13' prevents the gap from becoming a vacuum by supplying air therein when the third cylindrical member 13 is removed and moves backward. On the contrary, when the third cylindrical member 13 is inserted into the hole 12' of the second cylindrical member 12, air contained in the gap is forced out. As a result the third cylindrical member can be moved. The air hole 13' doesn't always need to be bored into the third cylindircal member 13. The air hole 13' may be bored in the first or second cylindrical members, 11 or 12, in order to attain the same performance as that of the third cylindrical member 13.

Figure 2:
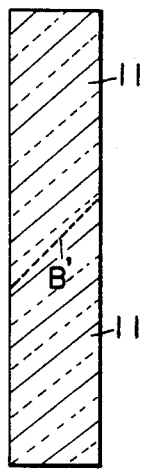
FIG. 2 is an outline view illustrating an example of how to make the first cylindrical member.

FIG. 2 is an outline view illustrating how to make the first cylindrical member 11. The cylindrical member 11 can be made by cutting a single transparent cylinder along the dotted line B' equivalent to the inclined surface B of the first cylindrical member 11 as shown in FIG. 2. In such a manner, two cylindrical members 11 can be made at the same time.

Figure 3:
FIG. 3 is an outline view illustrating an example of how to make the second cylindrical member.

FIG. 3 is an outline view illustrating how to make the second cylindrical member 12. The cylindrical member 12 can be made by first boring a hole 12' through a single transparent cylinder as shown in FIG. 3 and secondly by cutting the cylindrical member 12 along the dotted line C equivalent to the inclined surface C of the second cylindrical member 12. In such a manner two cylindrical members 12 can be made at the same time.

Figure 4:
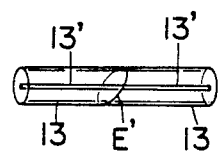
FIG. 4 is a perspective view illustrating how to make the third cylindrical member.

FIG. 4 is a perspective view illustrating how to make the third cylindrical member 13. The cylindrical member 13 can be made by cutting a single transparent cylinder along the dotted line E' equivalent to the inclined surface E of the cylindrical member 13 shown before. Two cylindrical members can also be made at the same time and in the same manner as mentioned before.

Figure 5:
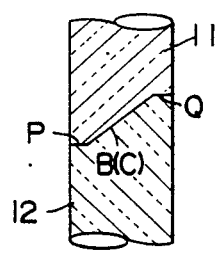
FIG. 5 is an outline view showing a construction of the connecting surfaces of the first and second cylindrical members.

FIG. 5 is an outline view showing a modified embodiment of the inclined connecting surfaces of the first cylindrical member 11 and the second cylindrical member 12. In this modified embodiment, the first and second cylindrical members 11 and 12 have uneven (concave-convex) portions P and/or Q on the inclined surfaces thereof. In such a manner, adjustments for having the first cylindrical member 11 match with the second cylindrical member 12 concentrically can be successful.

The embodiment of the present invention is described heretofore. In the embodiment, the first through fourth cylindrical members (11 through 14) are constructed without any protective covering. Therefore, dust or the like can attach to the surface thereof so that the light energy will likely leak out therefrom.

In FIG. 1, 20 is a protective member which is mounted for the purpose of avoiding such problems. The protective member 20 is mounted on a predetermined place apart from the other cylindrical members by use of spacers 21. However, since the third cylindrical member 13 is capable of moving in a direction shown by the arrow in FIG. 1 in the hole 12' of the second cylindrical member 12, no spacer is used for the third cylindrical member 13. Since an adjacent layer 1' and another adjacent layer 5' are formed, respectively, on the outer peripheral surfaces of the optical conductor 1 at the light source side and the optical conductor 5 at the light emission side, a gap between the cylindrical member and the protective member can be produced corresponding to the thickness of those adjacent layers. Consequently, it may be much easier to connect the optical conductor with the light diverting and switching device according to the manner proposed in the present invention.

Figure 6:
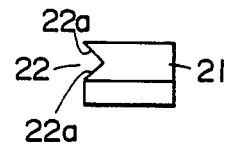
FIG. 6 is an outline view showing an example of a spacer.

FIG. 6 is an outline view showing an example of the spacer 21. A groove 22 formed in the shape of a V is engraved in the spacer 21 at the edge portion thereof, that is, at the side thereof coming into contact with the cylindrical member, as shown in FIG. 6. The cylindrical member is supported on both line-portions $22a$ of the groove 22 formed in the V shape. Therefore the contact area of the spacer and the cylindrical member is very small and the light scarcely leaks out from the contact area.

Furthermore, when constructing the device to protect the respective cylindrical members by use of protective members, it may be impossible to insert the cylindrical member into the protective member. On that occasion, for example, two of the half-shaped products having a section as shown in FIG. 6 will be able to be made and later unitarily combined into one by use of an adhesive.

FIG. 7 is a cross-section showing the construction of a plurality of light diverting and switching devices as mentioned above which are connected in cascade and installed on an optional desired place. In FIG. 7, $10_1$, $10_2$, $10_3$, and $10_4$ are the light diverting and switching devices as mentioned above. FIG. 7 shows an example of connecting four light diverting and switching devices in cascade to illuminate the different floor-levels of a building.

When connecting the devices in such a manner, if the light energy is diverted at the upstream end thereof, the density of the light energy decreases at the downstream end thereof so that the intensity of the diverted light is considerably less.

In order to avoid such a problem, the cross-sectional area of the cylindrical member 13 for diverting and switching the light is gradually increased in the direction of the downstream side. When four light diverting and switching devices are needed as shown in FIG. 7, the cross-sectional area of the first cylindrical member $13_1$ at the highest upstream side is determined by one fourth ($\frac{1}{4}$) of the cross-sectional area of the first optical conductor 11, that of the second cylindrical member $13_2$ by one third ($\frac{1}{3}$) thereof, and that of the third cylindrical member $13_3$ by one half ($\frac{1}{2}$) thereof. In general, if the number of diverting and switching devices n, the cross-sectional area of the first cylindrical member for diverting and switching the light is determined by $1/n$, that of the second cylindrical member by $1/(n-1)$, that of the third cylindrical member by $1/(n-2)$, and so on for the remaining cylindrical members. Finally, if the cross-sectional area of the last n-th cylindrical member is determined by $1/n-(n-1)=1$, light of approximately uniform intensity will result from all of the diverting portions when employing all of the light diverting and switching devices.

Furthermore, in FIG. 7, $L_1$ through $L_4$ comprise the light beams to be communicated, e.g., laser light beams. Utilizing the light diverting and switching device, according to the present invention, information is transmitted back and forth between the light source side and the respective diverted light sides (the terminal sides). For instance, in FIG. 7, when the edge portion of the optical conductor 1, not shown in the drawing, is connected with a solar ray collecting device placed on the rooftop of a building, and the light diverting and switching device $10_1$ is used for illuminating the fourth floor therein, $10_2$ for illuminating the third floor therein, $10_3$ for illuminating the second floor, and $10_4$ for illuminating the first floor, communication between the rooftop and the fourth floor can be performed with the light beam $L_1$, and communication between the rooftop and the third floor can be performed with the light leam $L_2$. In such a manner, communication between the rooftop and the other floors can be accomplished.

As is apparent from the foregoing description, it may be possible to provide a light diverting and switching device through which light energy can be effectively diverted and which can easily be manufactured according to the present invention.

What I claim is:

1. A light diverting and switching device connected in cascade between one transparent cylindrical optical conductor at a light source side and another transparent cylindrical optical conductor at a light emission side for diverting and picking up a part of light transmitted through said optical conductors, comprising a first transparent cylindrical member havng one surface formed on a horizontal plane connected with said one optical conductor at the light source side and another surface formed on a plane inclined with respect to said horizontal plane, a second transparent cylindrical member having one surface formed on said inclined plane connected with the inclined another surface of said first cylindrical member and another surface formed on a horizontal plane connected with said another optical conductor at the light emission side, the second transparent cylindrical member being further provided with a circular hole elongated in a horizontal direction toward said inclined surfaces, a third transparent cylindrical member for diverting light installed to move back and forth in said circular hole of said second cylindrical member and having an edge surface formed on an inclined plane parallel to the inclined one surface of said second cylindrical member, and a fourth transparent cylindrical member connected with said first cylindrical member and having a connecting surface disposed at a position to receive reflected light from said another inclined surface of said first transparent cylindrical member such that said fourth transparent cylindrical member thereby receives said diverted light.

2. A light diverting and switching device as defined in claim 1, wherein said third cylindrical member further comprises a bored vent hole therethrough for preventing formation of a vacuum between said inclined edge surface of said third cylindrical member and the inclined another surface of said first cylindrical member.

3. A light diverting and switching device as defined in claim 1 further comprising an optical matching oil enclosed between said inclined edge surface of said third cylindrical member and the inclined another surface of said first cylindrical member.

4. A light diverting and switching device as defined in claim 1, wherein the another surface of said first cylindrical member and the one surface of said second cylindrical member are connected by a member selected from the group consisting of an optical paste, an optical gel and an optical matching oil.

5. A light diverting and switching device as defined in claim 1, wherein said surfaces of said first and second cylindrical members on said inclined plane each have concave and convex end portions engaged with each other concentrically.

6. A light diverting and switching device connected in cascade between one transparent cylindrical optical conductor at a light source side and another transparent cylindrical optical conductor at a light emission side for diverting and picking up a part of light transmitted through said optical conductors, comprising a first transparent cylindrical member having one surface on a horizontal plane connected with said one optical conductor at the light source side and another surface formed on a plane inclined with respect to said horizontal plane, a second transparent cylindrical member having one surface formed on said inclined plane connected with the inclined another surface of said first cylindrical member and another surface formed on a horizontal plane connected with said another optical conductor at the light emission side, the second transparent cylindrical member being further provided with a circular hole elongated in a horizontal direction toward said inclined surfaces, a third transparent cylindrical member for diverting light installed to move back and forth in said circular hole of said second cylindrical member and having an edge surface formed on an inclined plane parallel to the inclined one surface of said second cylindrical member, a fourth transparent cylindrical member connected with said first cylindrical member and having a connecting surface disposed at a position to receive reflected light from said another inclined surface of said first transparent cylindrical member such that said fourth transparent cylindrical member thereby receives said diverted light, and a protective member surrounding said first through fourth members for protecting said first through fourth cylindrical members.

7. A light diverting and switching device connected in cascade between one transparent cylindrical optical conductor at a light source side and another transparent cylindrical optical conductor at a light emission side comprising a plurality of light diverting and switching portions connected in series between said one and another optical conductors for diverting and picking up a part of light transmitted through said optical conductors, wherein each of said light diverting and switching portions comprises a first transparent cylindrical member having one surface formed on a horizontal plane at the light source side and another surface formed on a plane inclined with respect to said horizontal plane, a second transparent cylindrical member having one surface formed on said inclined plane connected with the inclined another surface of said first cylindrical member and another surface formed on a horizontal plane at the light emission side, the second transparent cylindrical member being further provided with a circular hole elongated in a horizontal direction toward said inclined surfaces, a third transparent cylindrical member for diverting light installed to move back and forth in said circular hole of said second cylindrical member and having an edge surface formed on an inclined plane parallel to the inclined one surface of said second cylindrical member, and a fourth transparent cylindrical member connected with said first cylindrical member and having a connecting surface disposed at a position to receive reflected light from said another inclined surface of said first transparent cylindrical member such that said fourth transparent cylindrical member thereby receives said diverted light, each third cylindrical member having a cross-sectional area, the cross-sectional area of each third cylindrical member being greater than the cross-sectional area of an immediately prior third cylindrical member with respect to the direction of light propagation from the light source side to the light emission side.

8. A light diverting and switching device as defined in claim 7, wherein the cross-sectional area of each third cylindrical member is such that diverted light transmitted from each of said light diverting and switching portions to each fourth transparent cylindrical member is approximately equal in intensity when all of said light diverting and switching portions divert transmitted light.

* * * * *